3,182,080
PROCESS FOR PRODUCING β-AMINO-γ-HYDROXYBUTYRIC ACID

Sumio Sakai, Tokyo, Michio Tanaka, Saitama-ken, and Hirobumi Furuya, Chiba-ken, Japan, assignors to Kaken Kagaku Kabushiki Kaisha, Tokyo, Japan, a corporation of Japan
No Drawing. Filed June 17, 1963, Ser. No. 288,533
Claims priority, application Japan, June 19, 1962, 37/24,695
5 Claims. (Cl. 260—534)

The present invention relates to a novel process for producing β-amino-γ-hydroxybutyric acid. An object of the present invention is to provide a process for producing said compound from easily available starting materials advantageously from the commercial point of view.

β-amino-γ-hydroxybutyric acid is an isomer of γ-amino-β-hydroxybutyric acid which is well known as an antiepilepsy agent. The above-mentioned isomer has use in controlling activity of the central nervous system.

As the process for the production of this compound, a process which comprises reacting lithium aluminum hydride with N-benzoyl aspartic acid mono-methyl ester as the starting material at a temperature of —40° C. and subjecting the resulting γ-hydroxy-β-benzoylaminobutyric acid to a hydrolysis with hydrochloric acid is known. However, this process is not adequate from the commercial point of view, since it is difficult to obtain the starting material.

We have found a novel process for producing β-amino-γ-hydroxybutyric acid, which is characterized by reacting γ-chloro-β-hydroxybutyronitrile with liquid ammonia in the absence or presence of a catalyst and subjecting the resulting β-amino-γ-hydroxybutyronitrile to a hydrolysis. The reactions are shown by the following equations.

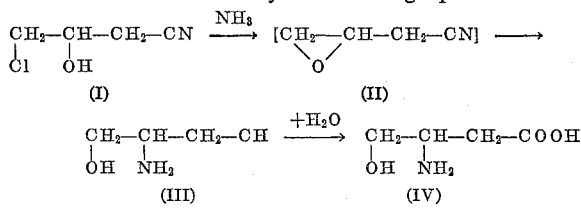

In the above-shown reaction, by reacting γ-chloro-β-hydroxybutyronitrile (I) with ammonia an oxygen-containing cyclic compound is formed as an intermediate product represented by the general formula of (II). Then, amino group is introduced in β-position, and consequently compound (III) wherein amino group is substituted with hydroxyl group is obtained. When liquid ammonia is used, the pure product (III) not containing γ-amino-β-hydroxybutyronitrile as a by-product may be obtained. It is an excellent point of the present invention. In this case, the yield is 50-60%, based on the theoretical yield. In the case where such a catalytic substance as alkali iodide, powdered copper, or copper compound is added to the reaction system, a high yield of 70-85% may be attained.

It is preferable for obtaining the objective material by substituting a carboxyl group for the nitrile group in the formula (III) to heat the compound in dilute acid or dilute alkali solution for 7-8 hours. In order to recover the objective material from the reaction liquor, the liquor is passed through strong acidic or strong basic ion exchange resins to adsorb the product, and the adsorbed product is eluted with dilute aqueous ammonia or acetic acid. Then, the resulting solution is concentrated under reduced pressure and added to alcohol, whereby crystals of the objective material can be obtained. As purity of the intermediate product (III) in the process of the present invention is high, it is quite advantageous from the commercial point of view that hydrolysis of the intermediate product can be carried out without necessity of purification.

The starting materials in the present invention may be obtained with a good yield by a conventional process of reacting epichlorohydrin with hydrogen cyanide gas or reacting alkali cyanide in acetic acid.

Example 1

1 kg. of γ-chloro-β-hydroxybutyronitrile and 10 g. of potassium iodide were placed into an autoclave and 1.5 kg. of liquid ammonia was added into the mixture under a pressure. The reaction was carried out at 40–45° C. for 6 hours with shaking, and thereafter ammonia was evaporated. The residue was boiled together with about twice as much 20% hydrochloric acid for 8 hours. After distilling the solution under a reduced pressure to dry and removing hydrochloric acid, a siutable amount of water was added to the residue and passed through a column of an ion exchange resin Dowex-50 (H type). Thus, the objective material was adsorbed and then the column was eluted with 2N-ammonia water. The effluent was concentrated and combined with three times as much methanol as the said solution. 550 g. of β-amino-γ-hydroxybutyric acid having a decomposing point of 217–219° C. was obtained.

Example 2

1 kg. of γ-chloro-β-hydroxybutyronitrile and 10 g. of powdered copper were placed into an autoclave and the reaction was carried out under the same conditions as in Example 1. The residue was dissolved in 5 liters of water and added with 650 g. of calcium hydroxide, followed by heating at 90–100° C. for 8 hours. Calcium hydroxide and the resulting calcium carbonate formed were separated by filtration. Thereafter, the same treatment as in Example 1 was carried out, thereby to obtain 637 g. of β-amino-γ-hydroxybutyric acid having a decomposing point of 217–219° C.

What we claim is:

1. A process for the production of beta-amino-γ-hydroxybutyric acid, which comprises the steps of reacting γ-chloro-β-hydroxybutyronitrile with liquid ammonia in a pressure vessel, and hydrolyzing the resulting β-amino-γ-hydroxy-butyronitrile while heating until the reaction is substantially complete.

2. A process for the production of β-amino-γ-hydroxybutyric acid, which comprises the steps of reacting γ-chloro-β-hydroxybutyronitrile with liquid ammonia in a pressurized zone in the presence of a catalyst selected from the group consisting of alkali iodides and powdered copper to produce β-amino-γ-hydroxy-butyronitrile, removing excess ammonia from the reaction mixture, and hydrolyzing the resulting β-amino-γ-hydroxybutyronitrile while heating the reaction mixture for a period of time sufficient for hydrolysis to substantially reach completion.

3. A process according to claim 2, wherein the catalyst is an alkali iodide.

4. A process according to claim 2, wherein the catalyst is powdered copper.

5. A process according to claim 2, wherein the hydrolysis is carried out for between about seven to about eight hours.

No references cited.

LORRAINE A. WEINBERGER, *Primary Examiner.*
LEON ZITVER, *Examiner.*